US011405889B2

(12) United States Patent
Zhang et al.

(10) Patent No.: US 11,405,889 B2
(45) Date of Patent: Aug. 2, 2022

(54) RESPONDING TO RADIO ACCESS NETWORK PAGING FAILURES

(71) Applicant: Lenovo (Beijing) Limited, Beijing (CN)

(72) Inventors: Zhuoyun Zhang, Beijing (CN); Chenxi Zhu, Beijing (CN); Lianhai Wu, Beijing (CN); Genadi Velev, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 156 days.

(21) Appl. No.: 16/639,482

(22) PCT Filed: Aug. 14, 2017

(86) PCT No.: PCT/CN2017/097315
§ 371 (c)(1),
(2) Date: Feb. 14, 2020

(87) PCT Pub. No.: WO2019/033231
PCT Pub. Date: Feb. 21, 2019

(65) Prior Publication Data
US 2021/0144675 A1 May 13, 2021

(51) Int. Cl.
*H04W 68/02* (2009.01)
*H04W 76/32* (2018.01)
*H04W 36/00* (2009.01)

(52) U.S. Cl.
CPC ....... *H04W 68/02* (2013.01); *H04W 36/0033* (2013.01); *H04W 76/32* (2018.02)

(58) Field of Classification Search
None
See application file for complete search history.

(56) References Cited

U.S. PATENT DOCUMENTS

2010/0069041 A1    3/2010    Wang et al.

FOREIGN PATENT DOCUMENTS

| CN | 101754326 A | 6/2010 |
| CN | 104185278 A | 12/2014 |
| CN | 106507399 A | 3/2017 |

OTHER PUBLICATIONS

PCT/CN2017/097316, "Notification of Transmittal of the International Search Report and the Written Opinion of the International Searaching Authority, or the Declaration", PCT, dated May 18, 2018, pp. 1-9.

(Continued)

*Primary Examiner* — Ayaz R Sheikh
*Assistant Examiner* — Sori A Aga
(74) *Attorney, Agent, or Firm* — Kunzler Bean & Adamson

(57) ABSTRACT

Apparatuses, methods, and systems are disclosed for responding to RAN paging failures. One apparatus (300) includes a processor (302), a transmitter (310), and a receiver (312). The receiver (312) receives (702) an access network context release request including an indication of RAN paging failure. The processor (302) suspends (704) a protocol data unit session deactivation procedure and triggering core network paging in response to receiving the indication of RAN paging failure. In response to the core network paging failing, the processor (302) resumes (706) the protocol data unit session deactivation procedure. In response to the core network paging succeeding, the transmitter (310) transmits (708) an access network context establishment request to a target RAN. In response to receiving an access network context establishment response from the target RAN, the transmitter (310) transmits (710) a protocol data unit session modification request. In response to receiving a protocol data unit session modification (Continued)

response, the transmitter (310) transmits (712) a data forwarding request to a source RAN.

20 Claims, 7 Drawing Sheets

(56) References Cited

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, pp. 1-386.

3GPP, "3rd Generation Partnership Project; Technical Specification Group Services and System Aspects; Procedures for the 5G System; Stage 2 (Release 15)", 3GPP TS 23.502 V0.5.0, Jul. 2017, pp. 1-148.

3GPP, "3rd Generation Partnership Project; Technical Specification Group Services and System Aspects; System Architecture for the 5G System; Stage 2 (Release 15)", 3GPP TS 23.501 V1.2.0, Jul. 2017, pp. 1-166.

Qualcomm Incorporated, "RRC inactive and RAN paging end-to-end behaviour", SA WG2 Meeting #118 S2-166537, Nov. 14-18, 2016, pp. 1-9.

NEC, "Solution for RAN paging failure: Use of UE Context Release", 3GPP TSG-RAN WG3 Meeting #95 R3-170576, Feb. 13-17, 2017, pp. 1-3.

RESPONDING TO RADIO ACCESS NETWORK PAGING FAILURES

FIELD

The subject matter disclosed herein relates generally to wireless communications and more particularly relates to responding to radio access network paging failures.

BACKGROUND

The following abbreviations are herewith defined, at least some of which are referred to within the following description: Third Generation Partnership Project ("3GPP"), Positive-Acknowledgment ("ACK"), Core Access and Mobility Management Function ("AMF"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced LTE ("eLTE"), Enhanced Mobile Broadband ("eMBB"), Evolved Node B ("eNB"), Evolved Packet Core ("EPC"), European Telecommunications Standards Institute ("ETSI"), Evolved, Universal Terrestrial Radio Access ("E-UTRA"), Frame Based Equipment ("FBE"), Frequency Division Duplex ("FDD"), Frequency Division Multiple Access ("FDMA"), Frequency Division Orthogonal Cover Code ("FD-OCC"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Mobility Management Entity ("MME"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Network Exposure Function ("NEF"), Next Generation Node B ("gNB"), New Radio ("NR"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Access Network ("RAN"), Radio Resource Control ("RRC"), Random Access Procedure ("RACH"), Random Access Response ("RAR"), Radio Network Temporary Identifier ("RNTI"), Reference Signal ("RS"), Remaining Minimum System Information ("RMSI"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Session Management Function ("SMF"), Synchronization Signal ("SS"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Data Management ("UDM"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), User Plane ("UP"), User Plane Function ("UPF"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a RAN paging failure may be persistent. In such networks, various devices in the networks may not know how to handle the RAN paging failure.

BRIEF SUMMARY

Apparatuses for responding to radio access network paging failures are disclosed. Methods and systems also perform the functions of the apparatus. In one embodiment, the apparatus includes a processor, a transmitter, and a receiver. In certain embodiments, the receiver receives an access network context release request including an indication of radio access network paging failure. In various embodiments, the processor suspends a protocol data unit session deactivation procedure and triggering core network paging in response to receiving the indication of radio access network paging failure. In some embodiments, in response to the core network paging failing, the processor resumes the protocol data unit session deactivation procedure. In one embodiment, in response to the core network paging succeeding, the transmitter transmits an access network context establishment request to a target radio access network. In certain embodiments, in response to receiving an access network context establishment response from the target radio access network, the transmitter transmits a protocol data unit session modification request. In various embodiments, in response to receiving a protocol data unit session modification response, the transmitter transmits a data forwarding request to a source radio access network.

In one embodiment, the access network context release request includes an indication of a radio access network transparent container. In a further embodiment, the access network context release request includes an indication of a session management access network information list.

In various embodiments, the access network context establishment request includes a radio access network transparent container and a session management access network information list, and the target radio access network configures itself based on the radio access network transparent container and the session management access network information list. In some embodiments, the access network context establishment response includes information indicating direct forwarding path availability between the source radio access network and the target radio access network. In one embodiment, the processor determines whether there is a direct path between the source radio access network and the target radio access network, and, in response to there being no direct path between the source radio access network and the target radio access network, the transmitter transmits a source access network tunnel address maintenance indication to a user plane function via a session management function. In a further embodiment, the user plan function maintains a source radio access network address for protocol data unit sessions in response to receiving the source access network tunnel address maintenance indication. In certain embodiments, the transmitter transmits a message to the source radio access network instructing the source radio access network to forward data to the target radio access network, and the message includes a target radio access network address.

In various embodiments, the transmitter transmits a message to the target radio access network indicating to the target radio access network to obtain access stratum context, buffered downlink data, or a combination thereof from the source radio access network, the message indicates to the target radio access network an identification of a remote unit, the target radio access network retrieves the access stratum context, the buffered downlink data, or a combination thereof from the source radio access network based on the identification of the remote unit, and the target radio access network configures itself based on the access stratum context. In some embodiments, the access network context release request includes information indicating that the source radio access network is to temporarily buffer downlink packets and to store access stratum context without the access network context release request including a radio access network transparent container.

In a further embodiment, in response to receiving the access network context release request including the information indicating that the source radio access network is to temporarily buffer downlink packets and to store access stratum context, the transmitter transmits a target radio access network address to the source radio access network, and the source radio access network forwards the buffered downlink packets and the access stratum context to the target radio access network using the target radio access network address. In certain embodiments, the target radio access network configures itself based on the access stratum context received from the source radio access network.

A method for responding to radio access network paging failures, in one embodiment, includes receiving an access network context release request including an indication of radio access network paging failure. In various embodiments, the method includes suspending a protocol data unit session deactivation procedure and triggering core network paging in response to receiving the indication of radio access network paging failure. In some embodiments, the method includes, in response to the core network paging failing, resuming the protocol data unit session deactivation procedure. In one embodiment, the method includes, in response to the core network paging succeeding, transmitting an access network context establishment request to a target radio access network. In certain embodiments, the method includes, in response to receiving an access network context establishment response from the target radio access network, transmitting a protocol data unit session modification request. In various embodiments, the method includes, in response to receiving a protocol data unit session modification response, transmitting a data forwarding request to a source radio access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
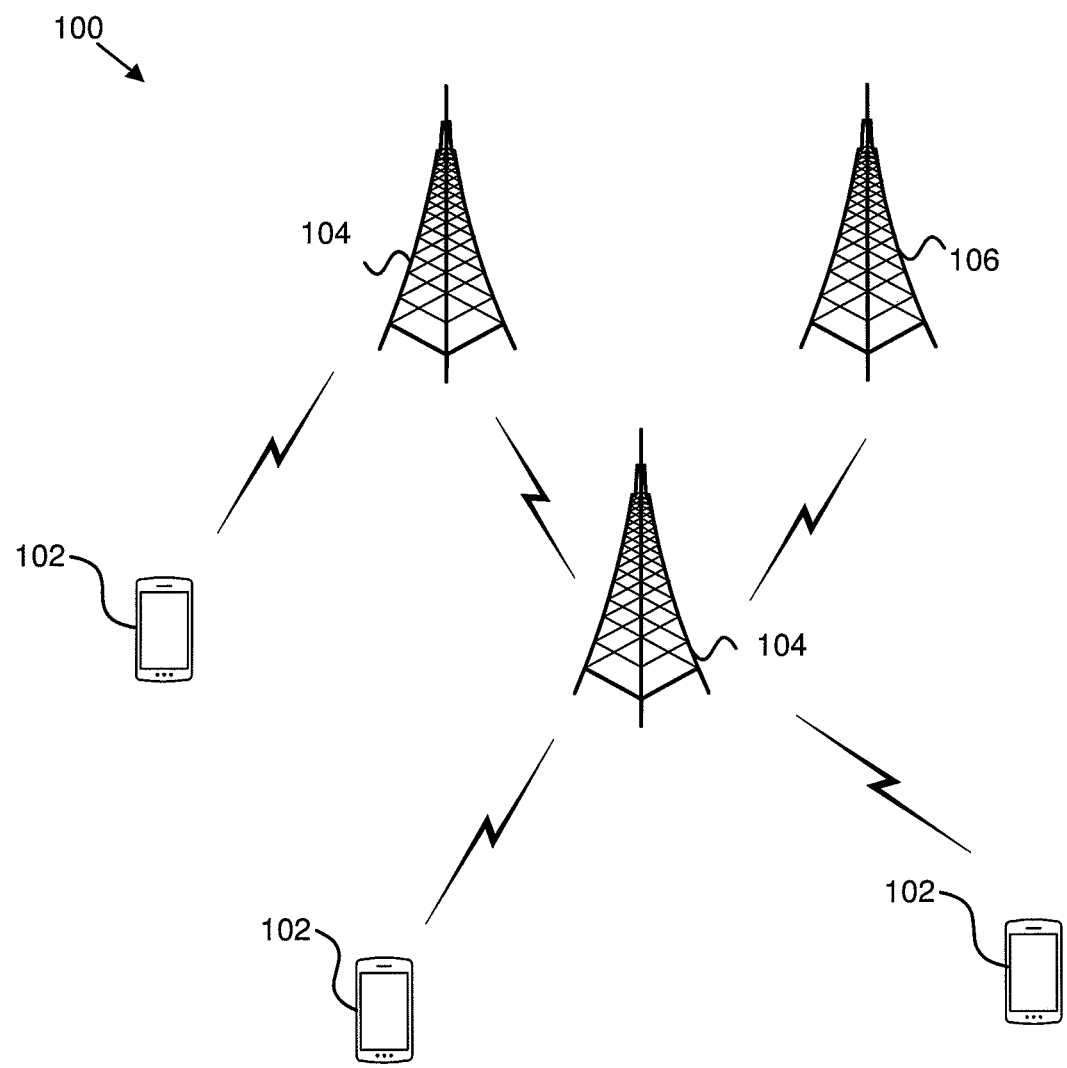
FIG. 1 is a schematic block diagram illustrating one embodiment of a wireless communication system for responding to radio access network paging failures.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for responding to radio access network paging failures. In one embodiment, the wireless communication system 100 includes remote units 102, base units 104, and a network function 106. Even though a specific number of remote units 102, base units 104, and network functions 106 are depicted in FIG. 1, one of skill in the art will recognize that any number of remote units 102, base units 104, and network functions 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, a core network (e.g., EPC, 5GC), an aerial server, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, the base unit 104 may include a RAN (e.g., 4G-RAN such as E-UTRA, 5G-RAN such as eLTE or NR). In certain embodiments, the network function 106 may include an MME, an AMF, a UPF, and/or an SMF.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a network function 106 may receive an access network context release request including an indication of radio access network paging failure. In various embodiments, the network function 106 may suspend a protocol data unit session deactivation procedure and triggering core network paging in response to receiving the indication of radio access network paging failure. In some embodiments, the network function 106 may, in response to the core network paging failing, resume the protocol data unit session deactivation procedure. In one embodiment, the network function 106 may, in response to the core network paging succeeding, transmit an access network context establishment request to a target radio access network. In certain embodiments, the network function 106 may, in response to receiving an access network context establishment response from the target radio access network, transmit a protocol data unit session modification request. In various embodiments, the network function 106 may, in response to receiving a protocol data unit session modification response, transmit a data forwarding request to a source radio access network. Accordingly, a network function 106 may be used for responding to radio access network paging failures.

Figure 2:
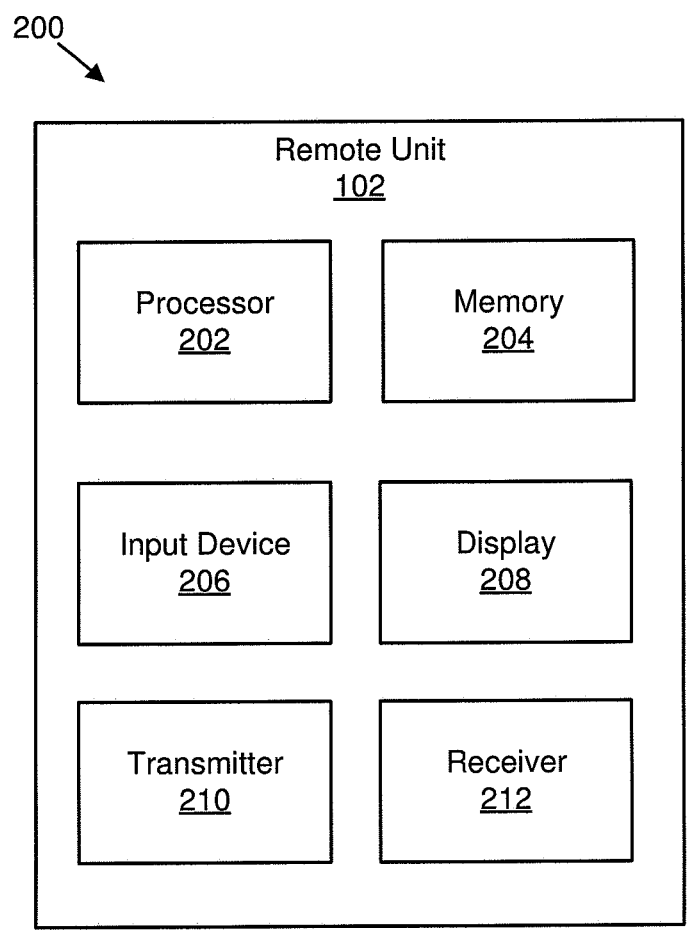
FIG. 2 is a schematic block diagram illustrating one embodiment of an apparatus that may be used for responding to radio access network paging failures.

FIG. 2 depicts one embodiment of an apparatus 200 that may be used for responding to radio access network paging failures. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
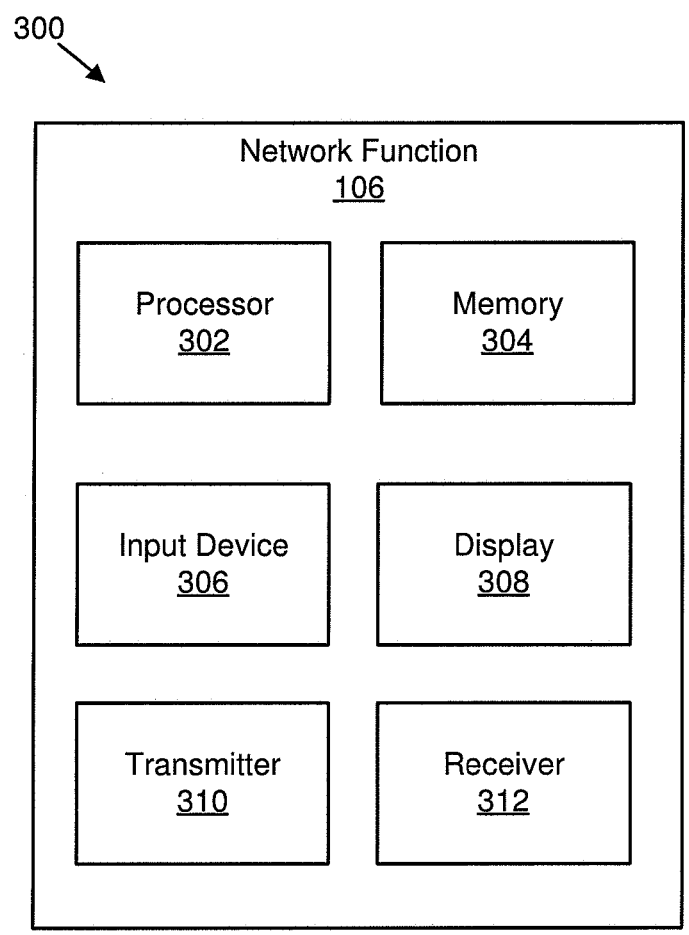
FIG. 3 is a schematic block diagram illustrating one embodiment of an apparatus that may be used for responding to radio access network paging failures.

FIG. 3 depicts one embodiment of an apparatus 300 that may be used for responding to radio access network paging failures. The apparatus 300 includes one embodiment of the network function 106. Furthermore, the network function 106 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may receive an access network context release request including an indication of radio access network paging failure. In various embodiments, the processor 302 may suspend a protocol data unit session deactivation procedure and triggering core network paging in response to receiving the indication of radio access network paging failure. In some embodiments, in response to the core network paging failing, the processor 302 may resume the protocol data unit session deactivation procedure. In one embodiment, in response to the core network paging succeeding, the transmitter 310 may transmit an access network context establishment request to a target radio access network. In certain embodiments, in response to receiving an access network context establishment response from the target radio access network, the transmitter 310 may transmit a protocol data unit session modification request. In various embodiments, in response to receiving a protocol data unit session modification response, the transmitter 310 may transmit a data forwarding request to a source radio access network. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
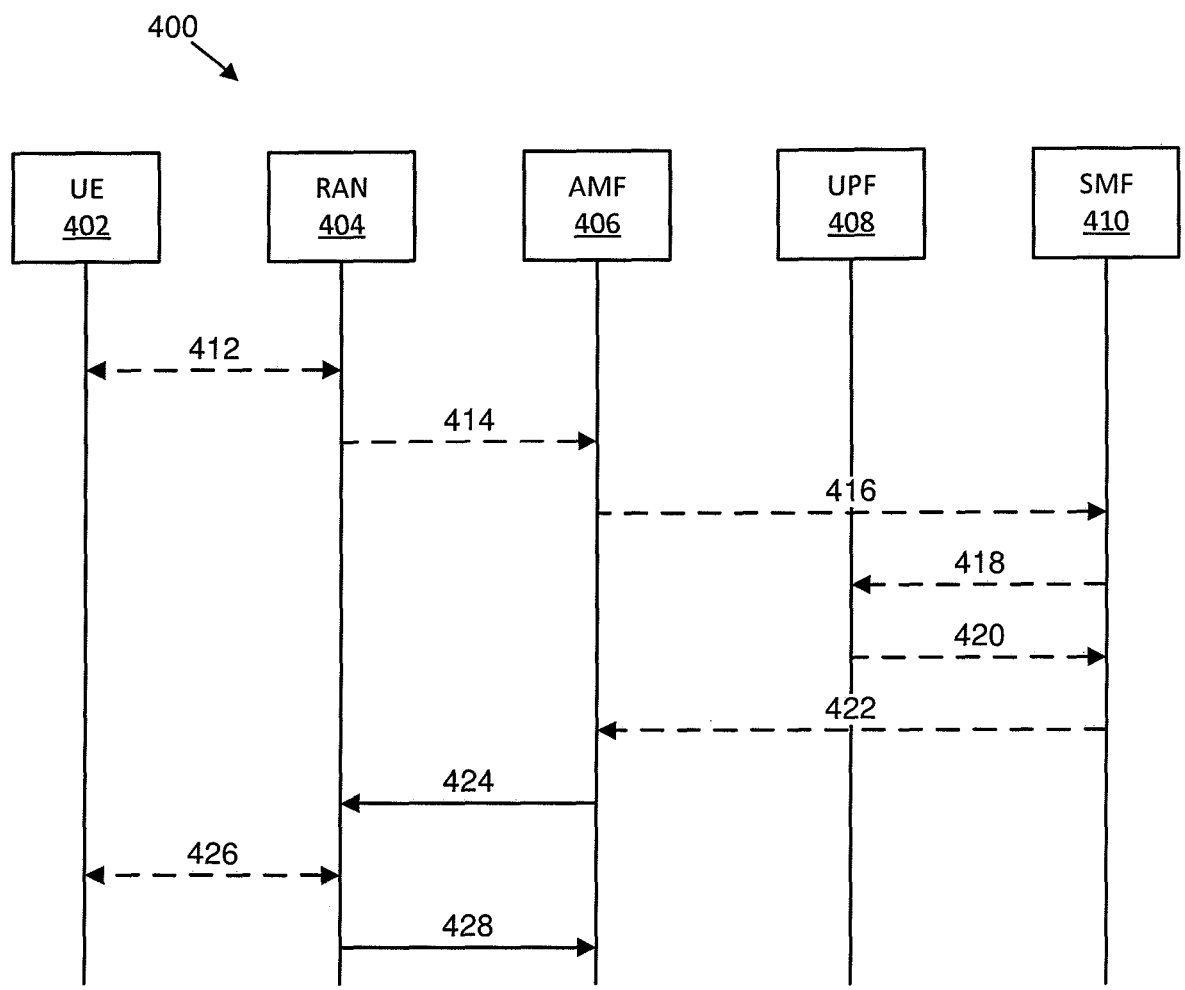
FIG. 4 is a schematic block diagram illustrating one embodiment of communications to facilitate responding to radio access network paging failures.

FIG. 4 is a schematic block diagram illustrating one embodiment of communications 400 to facilitate responding to radio access network paging failures. The communications 400 include communication between a UE 402, a RAN 404, an AMF 406, a UPF 408, and an SMF 410. However, in other embodiments, the communications may be between different devices.

In certain embodiments, a first communication 412 between the UE 402 and the RAN 404 may include one or more messages used to release a signaling path over an access network. In some embodiments, a second communication 414 transmitted from the RAN 404 to the AMF 406 may include an access network (e.g., N2) context release request. In various embodiments, a third communication 416 transmitted from the AMF 406 to the SMF 410 may include a PDU session deactivation request (e.g., an N11 PDU session deactivation request).

In certain embodiments, a fourth communication 418 transmitted from the SMF 410 to the UPF 408 may include a session modification request (e.g., an N4 session modification request). In some embodiments, a fifth communication 420 transmitted from the UPF 408 to the SMF 410 may include a session modification response (e.g., an N4 session modification response). In various embodiments, a sixth communication 422 transmitted from the SMF 410 to the AMF 406 may include a PDU session deactivation response (e.g., an N11 PDU session deactivation response).

In certain embodiments, a seventh communication 424 transmitted from the AMF 406 to the RAN 404 may include an access network (e.g., N2) context release command. In some embodiments, an eighth communication 426 between the UE 402 and the RAN 404 may include one or more messages used to release a signaling path over the access network. In various embodiments, a ninth communication 428 transmitted from the RAN 404 to the AMF 406 may include an access network (e.g., N2) context release complete message.

Figure 5:
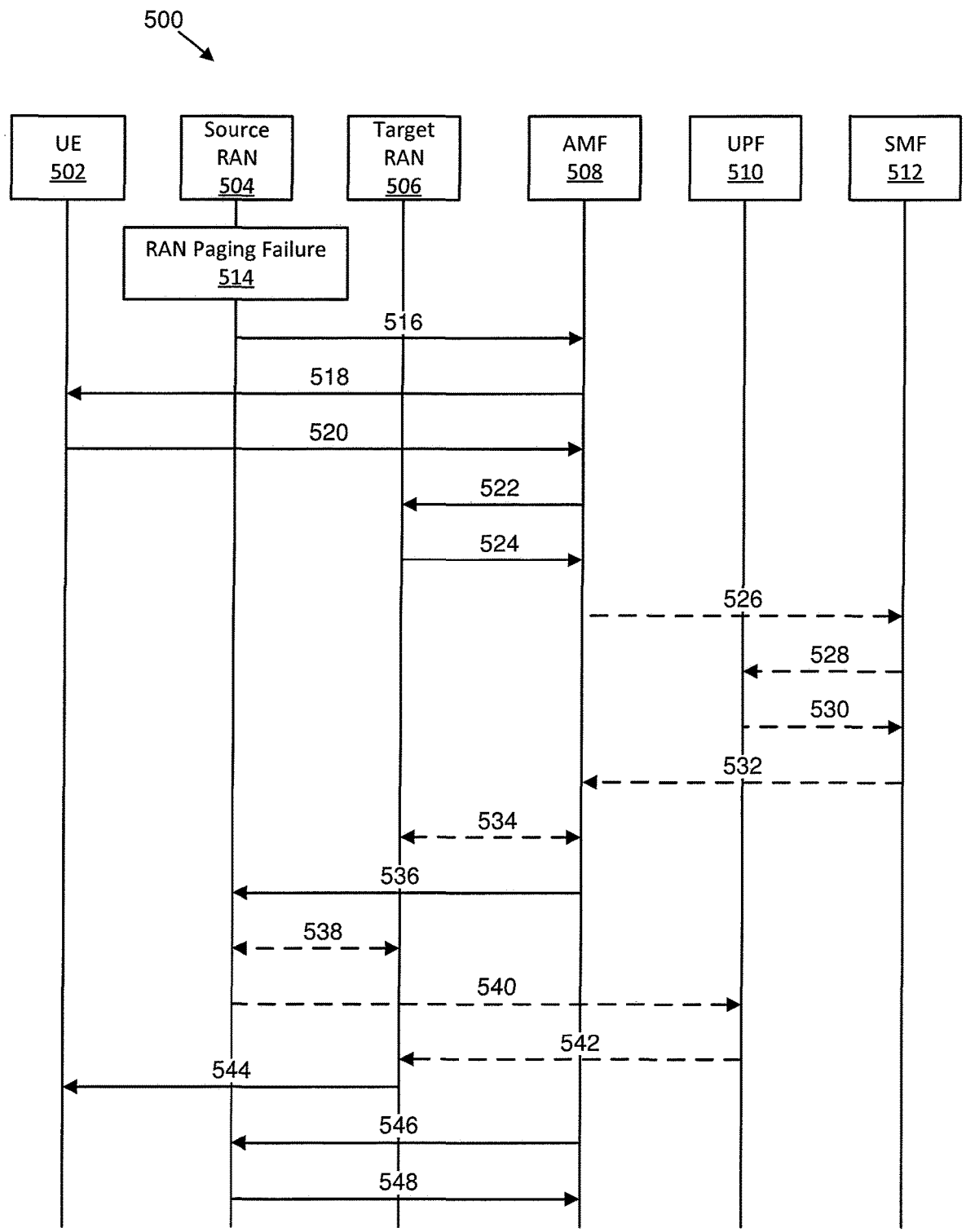
FIG. 5 is a schematic block diagram illustrating another embodiment of communications to facilitate responding to radio access network paging failures.

FIG. 5 is a schematic block diagram illustrating another embodiment of communications 500 to facilitate responding to radio access network paging failures. The communications 500 include communication between a UE 502, a source RAN 504, a target RAN 506, an AMF 508, a UPF 510, and an SMF 512. However, in other embodiments, the communications may be between different devices.

In various embodiments, a RAN paging failure 514 may be detected by the source RAN 504. In certain embodiments, if the RAN paging failure 514 happens in the source RAN 504, the source RAN 504 may decide to initiate a UE context release procedure.

In certain embodiments, a first communication 516 transmitted from the source RAN 504 to the AMF 508 may include an access network (e.g., N2) UE context release request. In various embodiments, the first communication 516 may include a cause value, a RAN paging area, a RAN transparent container, and/or a session management ("SM") access network information list. In some embodiments, the cause value may indicate a reason for the context release request (e.g., RAN paging failure). In certain embodiments, a SM access network information list includes all PDU sessions handled by the source RAN 504 (e.g., all existing PDU sessions with active user plane connections). In various embodiments, the RAN transparent contain includes the UE 502 access stratum ("AS") context in the source RAN 504 which are to be transferred to the target RAN 506.

In some embodiments, a second communication 518 transmitted from the AMF 508 to the UE 502 may initiate a core network ("CN") paging procedure. In various embodiments, the AMF 508 may check the cause value of the UE context release request. In one embodiment, if the cause value indicates "RAN paging failure," the AMF 508 may temporarily change the UE 502 from a connected state (e.g., CM-CONNECTED state) to an idle state (e.g., CM-IDLE state), and may initiate the CN paging procedure. In certain embodiments, the AMF 508 may not inform one or more corresponding SMFs 512 about the transition to the idle state as long as the CN paging procedure is ongoing. Accordingly, in such embodiments, N3 tunnels between the UPFs 510 and the source RAN 504 may be kept as established. In various embodiments, if further DL packets arrive at the UPFs 510, the DL packets may be forwarded to the source RAN 504. In some embodiments, if the cause value indicates "RAN paging failure," the AMF 508 may mark the UE 502 as being temporarily in an idle state, but the AMF 508 may not indicate the idle state to the subscribed SMFs 512 for activated PDU sessions. In one embodiment, if the CN paging fails, the AMF 508 may perform a PDU session deactivation procedure as described in communications 416 through 422 of FIG. 4. In certain embodiments, if the CN paging succeeds, the AMF 508 may perform a PDU session modification procedure as described in communications 526 through 532.

In various embodiments, a third communication 520 transmitted from the UE 502 to the AMF 508 may be transmitted in response to CN paging. In some embodiments, when the UE 502 receives CN paging, the UE's RRC layer may indicate to the UE's non-access stratum ("NAS") layer that the RRC state is idle (e.g., RRC IDLE). In such embodiments, the RRC layer may delete an existing AS context. Moreover, the UE's NAS layer changes to CM IDLE state and initiates the service request procedure. In certain embodiments, during an RRC Connection establishment procedure with the target RAN 506, the UE 502 may include an RRC establishment cause, and location information. In such embodiments, the RRC establishment cause may be set to "responds to paging." In various embodiments, if the AMF 508 doesn't receive the service request from the UE 502 within a certain time (e.g., the CN paging fails), the AMF 508 may perform a PDU session deactivation procedure as described in communications 416 through 422 of FIG. 4.

In certain embodiments, a fourth communication 522 transmitted from the AMF 508 to the target RAN 506 may include an access network UE context establishment request message. In various embodiments, in the fourth communication 522 the AMF 508 includes the SM access network information list that is received from the source RAN 504. Moreover, in the fourth communication 522, if the AMF 508 received a RAN transparent container in the first communication 516, the AMF 508 may transmit the RAN transparent container. Further, the AMF 508 may indicate the source RAN 504 identity to the target RAN 506 to allow the target RAN 506 to determine whether an interface connection (e.g., X2 or Xn interface connection) to the source RAN 504 is available (e.g., for DL data forwarding).

In some embodiments, a fifth communication 524 transmitted from the target RAN 506 to the AMF 508 may include an access network UE context establishment response message. In such embodiments, the access network UE context establishment response message may include SM access network response list, PDU sessions failed to be setup list, and/or direct forwarding path availability. Accordingly, the AMF 508 may be informed about whether there is a direct path between the source RAN 504 and target RAN 506 based on the direct forwarding path availability included in the access network UE context establishment response message. In certain embodiments, the SM access network response list includes access network tunnel information (e.g., N3 UP address and tunnel identifications of RAN) for each target RAN 506 accepted PDU session.

In various embodiments, a sixth communication 526 (optional communication) transmitted from the AMF 508 to the SMF 512 may include a PDU session modification request (e.g., an N11 PDU session modification request). In certain embodiments, for each of the PDU sessions accepted by the target RAN 506, the AMF 508 may instruct the SMF 512 to update the PDU session by sending the PDU session modification request. In some embodiments, the PDU session modification request may include a PDU session identification ("ID"), an access network tunnel address, and/or source access network tunnel address maintenance information. In one embodiment, an access network tunnel address is the address of the target RAN 506. In various embodiments, source access network tunnel address maintenance information is included if there is no direct path between the source RAN 504 and the target RAN 506. Accordingly, the source access network tunnel address maintenance information indicates whether a source access network tunnel address needs to be reserved. In certain embodiments, if the direct forwarding path availability indicates that there is no direct path between the source RAN 504 and the target RAN 506, the AMF 508 may send new access network tunnel address and source access network tunnel address maintenance indications to the SMF 512. The SMF 512 may forward the indications to the UPF 510. In some embodiments, source access network tunnel address maintenance may indicate that the UPF 510 needs to reserve the address of the source RAN 504 until the indirect data forwarding is complete. In various embodiments, if the direct forwarding path availability indicates that there is a direct path between the source RAN 504 and the target RAN 506, the AMF 508 doesn't need to send a source access network tunnel address maintenance indication.

In certain embodiments, a seventh communication 528 (optional communication) transmitted from the SMF 512 to the UPF 510 may include a session modification request (e.g., an N4 session modification request). The session modification request may include a PDU session ID, an access network tunnel address, and/or source access network tunnel address maintenance information. In various embodiments, the SMF 512 session modification procedure may indicate a need to change the access network tunnel address. In some embodiments, if the UPF 510 receives a source access network tunnel address maintenance indication, the UPF 510 may maintain the address of the source RAN 504 for PDU sessions.

In some embodiments, an eighth communication 530 (optional communication) transmitted from the UPF 510 to the SMF 512 may include a session modification response (e.g., an N4 session modification response) acknowledging the SMF 512 request.

In various embodiments, a ninth communication 532 (optional communication) transmitted from the SMF 512 to the AMF 508 may include a PDU session modification response (e.g., an N11 PDU session modification response). In one embodiment, the PDU session modification response includes SM information.

In certain embodiments, a tenth communication 534 between the AMF 508 and the target RAN 506 may include one or more messages used for an access network (e.g., N2) UE context update request and an access network context update response. In various embodiments, the tenth communication 534 includes CN tunnel information (e.g., N3 tunnel information) and/or SM information (e.g., N2 SM information). In one embodiment, the target RAN 506 sends a response to the AMF 508 to confirm the UE context update request.

In some embodiments, an eleventh communication 536 transmitted from the AMF 508 to the source RAN 504 may include a data forwarding command message. In certain embodiments, the data forwarding command message may include a target RAN address, sessions subject to forwarding, and/or sessions to release. In one embodiment, the sessions subject to forwarding includes a list of sessions to be forwarded. In some embodiments, the sessions to release includes a list of sessions to be released. In certain embodiments, the source RAN 504 may start forwarding downlink data from the source RAN 504 to the target RAN 506 in response to receiving the data forwarding command message.

In various embodiments, a twelfth communication 538 between the source RAN 504 and the target RAN 506 may include one or more messages directly forwarding data from the source RAN 504 to the target RAN 506. In certain embodiments, a thirteenth communication 540 transmitted from the source RAN 504 to the UPF 510 and a fourteenth communication 542 transmitted from the UPF 510 to the target RAN 506 may be used to indirectly forward data from the source RAN 504 to the target RAN 506.

In various embodiments, a fifteenth communication 544 transmitted from the target RAN 506 to the UE 502 may include information for an RRC connection reconfiguration. In some embodiments, the target RAN 506 performs an RRC connection reconfiguration with the UE 502 depending on the QoS information for all the QoS flows of the PDU sessions activated and data radio bearers. In one embodiment, user plane security is established by the fifteenth communication 544. In certain embodiments, the target RAN 506 forwards an NAS service accept message to the UE 502. In some embodiments, the UE 502 may locally delete context of PDU sessions that are not available in a CN.

In certain embodiments, a sixteenth communication 546 transmitted from the AMF 508 to the source RAN 504 may include an access network UE context release request. In some embodiments, a seventeenth communication 548 transmitted from the source RAN 504 to the AMF 508 may include an access network UE context release complete message. In some embodiments, with the access network UE context release complete message, the signaling connection between the AMF 508 and the source RAN 504 for the UE 502 is released.

In various embodiments, if the RAN paging procedure fails, the source RAN 504 may indicate to the AMF 508 a RAN paging failure as part of the first communication 516. In such embodiments, the RAN paging failure indication may include a RAN paging reason and/or cause and may indicate that the source RAN 504 continues to temporarily buffer DL packets and to store UE AS context without sending the RAN transparent container. In some embodiments, the first communication 516 including the RAN paging failure indication may be an access network ("N2") notification message.

In certain embodiments, the fourth communication 522 may provide information to the target RAN 506 to indicate to the source RAN 504 to fetch the UE's AS context. In some embodiments, the AMF 508 may transmit the target RAN address to the source RAN 504 to enable the source RAN 504 to forward AS configuration and downlink data to the target RAN 506.

Figure 6:
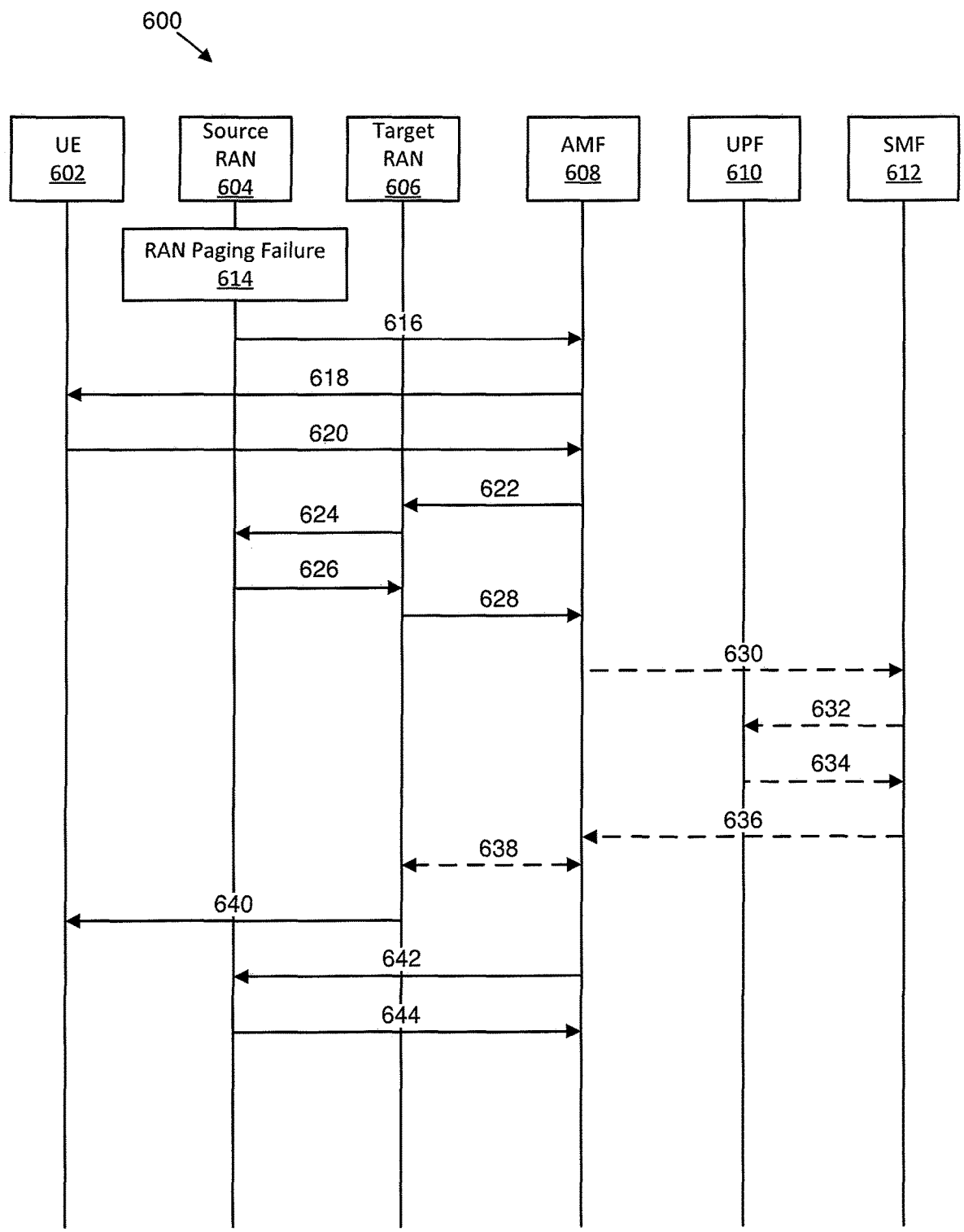
FIG. 6 is a schematic block diagram illustrating a further embodiment of communications to facilitate responding to radio access network paging failures.

FIG. 6 is a schematic block diagram illustrating a further embodiment of communications 600 to facilitate responding to radio access network paging failures. The communications 600 include communication between a UE 602, a source RAN 604, a target RAN 606, an AMF 608, a UPF 610, and an SMF 612. However, in other embodiments, the communications may be between different devices.

In various embodiments, a RAN paging failure 614 may be detected by the source RAN 604. In certain embodiments, if the RAN paging failure 614 happens in the source RAN 604, the source RAN 604 may decide to initiate a UE context release procedure.

In certain embodiments, a first communication 616 transmitted from the source RAN 604 to the AMF 608 may include an access network (e.g., N2) UE context release request. In various embodiments, the first communication 616 may include the UE's 602 resume ID, a cause value, a RAN paging area, and/or a session management ("SM") access network information list. In some embodiments, the cause value may indicate a reason for the context release request (e.g., RAN paging failure). In certain embodiments, a SM access network information list includes all PDU sessions handled by the source RAN 604 (e.g., all existing PDU sessions with active user plane connections). In some embodiments, the first communication 616 indicates that the source RAN 604 continues to temporarily buffer DL packets and to store UE AS context without sending a RAN transparent container. In some embodiments, the first communication 616 may be an access network notification message (e.g., an N2 notification message).

In some embodiments, a second communication 618 transmitted from the AMF 608 to the UE 602 may initiate a CN paging procedure. In various embodiments, the AMF 608 may check the cause value of the UE context release request. In one embodiment, if the cause value indicates "RAN paging failure," the AMF 608 may temporarily change the UE 602 from a connected state (e.g., CM-CONNECTED state) to an idle state (e.g., CM-IDLE state), and may initiate the CN paging procedure. In certain embodiments, the AMF 608 may not inform one or more corresponding SMFs 612 about the transition to the idle state as long as the CN paging procedure is ongoing. Accordingly, in such embodiments, N3 tunnels between the UPFs 610 and the source RAN 604 may be kept as established. In various embodiments, if further DL packets arrive at the UPFs 610, the DL packets may be forwarded to the source RAN 604. In some embodiments, if the cause value indicates "RAN paging failure," the AMF 608 may mark the UE 602 as being temporarily in an idle state, but the AMF 608 may not indicate the idle state to the subscribed SMFs 612 for activated PDU sessions. In one embodiment, if the CN paging fails, the AMF 608 may perform a PDU session deactivation procedure as described in communications 416 through 422 of FIG. 4. In certain embodiments, if the CN paging succeeds, the AMF 608 may perform a PDU session modification procedure as described in communications 630 through 636.

In various embodiments, a third communication 620 transmitted from the UE 602 to the AMF 608 may be transmitted in response to CN paging. In some embodiments, when the UE 602 receives CN paging, the UE's RRC layer may indicate to the UE's non-access stratum ("NAS") layer that the RRC state is idle (e.g., RRC IDLE). In such embodiments, the RRC layer may delete an existing AS context. Moreover, the UE's NAS layer changes to CM IDLE state and initiates the service request procedure. In certain embodiments, during an RRC Connection establishment procedure with the target RAN 606, the UE 602 may include an RRC establishment cause, and location information. In such embodiments, the RRC establishment cause may be set to "responds to paging."

In certain embodiments, a fourth communication 622 transmitted from the AMF 608 to the target RAN 606 may include an access network UE context establishment request message. In various embodiments, in the fourth communication 622, the AMF 608 may transmit the UE's 602 resume ID and an indication of RAN paging failure to inform the target RAN 606 to retrieve the UE context and DL data from the source RAN 604. Further, the target RAN 606 determines whether an interface connection (e.g., X2 or Xn interface connection) to the source RAN 604 is available (e.g., for DL data forwarding).

In one embodiment, a fifth communication 624 transmitted from the target RAN 606 to the source RAN 604 may include a context retrieve request including the UE's 602 resume ID so that the target RAN 606 may retrieve the context of the UE 602 from the source RAN 604. In various embodiments, a sixth communication 626 transmitted from the source RAN 604 to the target RAN 606 may include the AS configuration and downlink data corresponding to the UE 602. The target RAN 606 may perform configurations to be configured for the UE 602.

In some embodiments, a seventh communication 628 transmitted from the target RAN 606 to the AMF 608 may include an access network UE context establishment response message. In such embodiments, the access network UE context establishment response message may include SM access network response list and/or PDU sessions failed to be setup list. In certain embodiments, the SM access network response list includes access network tunnel information (e.g., N3 UP address and tunnel identifications of RAN) for each target RAN 606 accepted PDU session.

In various embodiments, an eighth communication 630 (optional communication) transmitted from the AMF 608 to the SMF 612 may include a PDU session modification request (e.g., an N11 PDU session modification request). In certain embodiments, for each of the PDU sessions accepted by the target RAN 606, the AMF 608 may instruct the SMF 612 to update the PDU session by sending the PDU session modification request. In some embodiments, the PDU session modification request may include a PDU session identification ("ID") and/or an access network tunnel address. In one embodiment, an access network tunnel address is the address of the target RAN 606.

In certain embodiments, a ninth communication 632 (optional communication) transmitted from the SMF 612 to the UPF 610 may include a session modification request (e.g., an N4 session modification request). The session modification request may include a PDU session ID and/or an access network tunnel address. In various embodiments, the SMF 612 session modification procedure may indicate a need to change the access network tunnel address.

In some embodiments, a tenth communication 634 (optional communication) transmitted from the UPF 610 to the SMF 612 may include a session modification response (e.g., an N4 session modification response) acknowledging the SMF 612 request.

In various embodiments, an eleventh communication 636 (optional communication) transmitted from the SMF 612 to the AMF 608 may include a PDU session modification response (e.g., an N11 PDU session modification response). In one embodiment, the PDU session modification response includes SM information.

In certain embodiments, a twelfth communication 638 between the AMF 608 and the target•RAN 606 may include one or more messages used for an access network (e.g., N2) UE context update request and an access network context update response. In various embodiments, the twelfth communication 638 includes CN tunnel information (e.g., N3 tunnel information) and/or SM information (e.g., N2 SM information). In one embodiment, the target RAN 606 sends a response to the AMF 608 to confirm the UE context update request.

In various embodiments, a thirteenth communication 640 transmitted from the target RAN 606 to the UE 602 may include information for an RRC connection reconfiguration. In some embodiments, the target RAN 606 performs an RRC connection reconfiguration with the UE 602 depending on the QoS information for all the QoS flows of the PDU sessions activated and data radio bearers. In one embodiment, user plane security is established by the thirteenth communication 640. In certain embodiments, the target RAN 606 forwards an NAS service accept message to the UE 602. In some embodiments, the UE 602 may locally delete context of PDU sessions that are not available in a CN.

In certain embodiments, a fourteenth communication 642 transmitted from the AMF 608 to the source RAN 604 may include an access network UE context release request. In some embodiments, a fifteenth communication 644 transmitted from the source RAN 604 to the AMF 608 may include an access network UE context release complete message. In some embodiments, with the access network UE context release complete message, the signaling connection between the AMF 608 and the source RAN 604 for the UE 602 is released.

Figure 7:
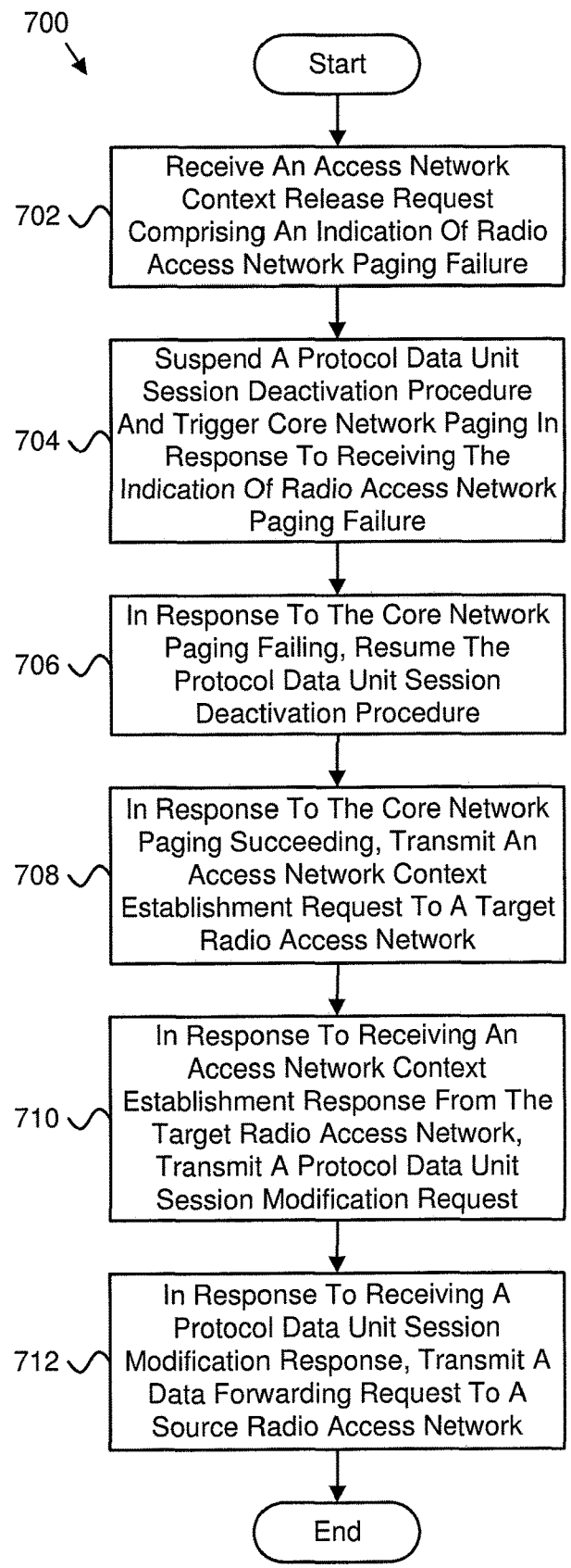
FIG. 7 is a schematic flow chart diagram illustrating one embodiment of a method for responding to radio access network paging failures.

FIG. 7 is a schematic flow chart diagram illustrating one embodiment of a method 700 for responding to radio access network paging failures. In some embodiments, the method 700 is performed by an apparatus, such as the network function 106 (e.g., AMF). In certain embodiments, the method 700 may be performed by a processor executing program code, for example, a microcontroller, a microprocessor, a CPU, a GPU, an auxiliary processing unit, a FPGA, or the like.

The method 700 may include receiving 702 an access network context release request including an indication of radio access network paging failure. In various embodiments, the method 700 includes suspending 704 a protocol data unit session deactivation procedure and triggering core network paging in response to receiving the indication of radio access network paging failure. In some embodiments, the method 700 includes, in response to the core network paging failing, resuming 706 the protocol data unit session deactivation procedure. In one embodiment, the method 700 includes, in response to the core network paging succeeding, transmitting 708 an access network context establishment request to a target radio access network. In certain embodiments, the method 700 includes, in response to receiving an access network context establishment response from the target radio access network, transmitting 710 a protocol data unit session modification request. In various embodiments, the method 700 includes, in response to receiving a protocol data unit session modification response, transmitting 712 a data forwarding request to a source radio access network.

In one embodiment, the access network context release request includes an indication of a radio access network transparent container. In a further embodiment, the access network context release request includes an indication of a session management access network information list.

In various embodiments, the access network context establishment request includes a radio access network transparent container and a session management access network information list, and the target radio access network configures itself based on the radio access network transparent container and the session management access network information list. In some embodiments, the access network context establishment response includes information indicating direct forwarding path availability between the source radio access network and the target radio access network. In one embodiment, the method 700 includes determining whether there is a direct path between the source radio access network and the target radio access network, and, in response to there being no direct path between the source radio access network and the target radio access network, transmitting a source access network tunnel address maintenance indication to a user plane function via a session management function. In a further embodiment, the user plan function maintains a source radio access network address for protocol data unit sessions in response to receiving the source access network tunnel address maintenance indication. In certain embodiments, the method 700 includes transmitting a message to the source radio access network instructing the source radio access network to forward data to the target radio access network, and the message includes a target radio access network address.

In various embodiments, the method 700 includes transmitting a message to the target radio access network indicating to the target radio access network to obtain access stratum context, buffered downlink data, or a combination thereof from the source radio access network, the message indicates to the target radio access network an identification of a remote unit, the target radio access network retrieves the access stratum context, the buffered downlink data, or a combination thereof from the source radio access network based on the identification of the remote unit, and the target radio access network configures itself based on the access stratum context. In some embodiments, the access network context release request includes information indicating that the source radio access network is to temporarily buffer downlink packets and to store access stratum context without the access network context release request including a radio access network transparent container.

In a further embodiment, the method 700, in response to receiving the access network context release request including the information indicating that the source radio access network is to temporarily buffer downlink packets and to store access stratum context, includes transmitting a target radio access network address to the source radio access network, and the source radio access network forwards the buffered downlink packets and the access stratum context to the target radio access network using the target radio access network address. In certain embodiments, the target radio access network configures itself based on the access stratum context received from the source radio access network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
  receiving an access network context release request comprising an indication of radio access network paging failure;
  suspending a protocol data unit session deactivation procedure and triggering core network paging in response to receiving the indication of radio access network paging failure;
  in response to the core network paging failing, resuming the protocol data unit session deactivation procedure;
  in response to the core network paging succeeding, transmitting an access network context establishment request to a target radio access network;
  in response to receiving an access network context establishment response from the target radio access network, transmitting a protocol data unit session modification request; and
  in response to receiving a protocol data unit session modification response, transmitting a data forwarding request to a source radio access network.

2. The method of claim 1, wherein the access network context release request comprises an indication of a radio access network transparent container.

3. The method of claim 1, wherein the access network context release request comprises an indication of a session management access network information list.

4. The method of claim 1, wherein transmitting the access network context establishment request to the target radio access network comprises transmitting a radio access network transparent container and a session management access network information list, and the target radio access network configures itself based on the radio access network transparent container and the session management access network information list.

5. The method of claim 1, wherein the access network context establishment response comprises information indicating direct forwarding path availability between the source radio access network and the target radio access network.

6. The method of claim 1, further comprising determining whether there is a direct path between the source radio access network and the target radio access network, and, in response to there being no direct path between the source radio access network and the target radio access network, transmitting a source access network tunnel address maintenance indication to a user plane function via a session management function.

7. The method of claim 6, wherein the user plan function maintains a source radio access network address for protocol data unit sessions in response to receiving the source access network tunnel address maintenance indication.

8. The method of claim 1, further comprising transmitting a message to the source radio access network instructing the source radio access network to forward data to the target radio access network, wherein the message comprises a target radio access network address.

9. The method of claim 1, further comprising transmitting a message to the target radio access network indicating to the target radio access network to obtain access stratum context, buffered downlink data, or a combination thereof from the source radio access network, wherein the message indicates to the target radio access network an identification of a remote unit, the target radio access network retrieves the access stratum context, the buffered downlink data, or a combination thereof from the source radio access network based on the identification of the remote unit, and the target radio access network configures itself based on the access stratum context.

10. The method of claim 1, wherein the access network context release request comprises information indicating that the source radio access network is to temporarily buffer downlink packets and to store access stratum context without the access network context release request including a radio access network transparent container.

11. The method of claim 10, wherein, in response to receiving the access network context release request comprising the information indicating that the source radio access network is to temporarily buffer downlink packets and to store access stratum context, transmitting a target radio access network address to the source radio access network, and wherein the source radio access network forwards the buffered downlink packets and the access stratum context to the target radio access network using the target radio access network address.

12. The method of claim 11, wherein the target radio access network configures itself based on the access stratum context received from the source radio access network.

13. An apparatus comprising:
a processor;
a transmitter; and
a receiver;
wherein:
the receiver receives an access network context release request comprising an indication of radio access network paging failure;
the processor suspends a protocol data unit session deactivation procedure and triggers core network paging in response to receiving the indication of radio access network paging failure;
in response to the core network paging failing, the processor resumes the protocol data unit session deactivation procedure;
in response to the core network paging succeeding, the transmitter transmits an access network context establishment request to a target radio access network;

in response to receiving an access network context establishment response from the target radio access network, the transmitter transmits a protocol data unit session modification request; and
in response to receiving a protocol data unit session modification response, the transmitter transmits a data forwarding request to a source radio access network.

14. The apparatus of claim 13, wherein the access network context establishment request comprises a radio access network transparent container and a session management access network information list, and the target radio access network configures itself based on the radio access network transparent container and the session management access network information list.

15. The apparatus of claim 13, wherein the access network context establishment response comprises information indicating direct forwarding path availability between the source radio access network and the target radio access network.

16. The apparatus of claim 13, wherein the processor determines whether there is a direct path between the source radio access network and the target radio access network, and, in response to there being no direct path between the source radio access network and the target radio access network, the transmitter transmits a source access network tunnel address maintenance indication to a user plane function via a session management function.

17. The apparatus of claim 16, wherein the user plan function maintains a source radio access network address for protocol data unit sessions in response to receiving the source access network tunnel address maintenance indication.

18. The apparatus of claim 13, wherein the transmitter transmits a message to the source radio access network instructing the source radio access network to forward data to the target radio access network, and the message comprises a target radio access network address.

19. The apparatus of claim 13, wherein the transmitter transmits a message to the target radio access network indicating to the target radio access network to obtain access stratum context, buffered downlink data, or a combination thereof from the source radio access network, the message indicates to the target radio access network an identification of a remote unit, the target radio access network retrieves the access stratum context, the buffered downlink data, or a combination thereof from the source radio access network based on the identification of the remote unit, and the target radio access network configures itself based on the access stratum context.

20. The apparatus of claim 19, wherein, in response to receiving the access network context release request comprising information indicating that the source radio access network is to temporarily buffer downlink packets and to store access stratum context, the transmitter transmits a target radio access network address to the source radio access network, and the source radio access network forwards the buffered downlink packets and the access stratum context to the target radio access network using the target radio access network address.

* * * * *